US012411934B2

(12) United States Patent
Kirby et al.

(10) Patent No.: US 12,411,934 B2
(45) Date of Patent: Sep. 9, 2025

(54) MEMORABLE AND STRONG PASSWORD GENERATOR AUTOMATED WITH A MACHINE LEARNING MODEL

(71) Applicant: Bank of America Corporation, Charlotte, NC (US)

(72) Inventors: Harry Kirby, Tega Cay, SC (US); Olga Kocharyan, Matthews, NC (US); Robert A. Levandowski, North Granby, CT (US); Marci Landy, Waxhaw, NC (US); Julius D. Jeffreys, Grove City, OH (US); Anthony D. Pedretti, Downers Grove, IL (US)

(73) Assignee: Bank of America Corporation, Charlotte, NC (US)

( * ) Notice: Subject to any disclaimer, the term of this patent is extended or adjusted under 35 U.S.C. 154(b) by 191 days.

(21) Appl. No.: 18/380,692

(22) Filed: Oct. 17, 2023

(65) Prior Publication Data

US 2025/0124121 A1    Apr. 17, 2025

(51) Int. Cl.
*G06F 21/46* (2013.01)
*G06N 20/20* (2019.01)

(52) U.S. Cl.
CPC ............. *G06F 21/46* (2013.01); *G06N 20/20* (2019.01)

(58) Field of Classification Search
CPC ......... G06F 21/46; G06F 21/45; G06N 20/20; G06N 20/00
See application file for complete search history.

(56) References Cited

U.S. PATENT DOCUMENTS

| | | | |
|---|---|---|---|
| 7,367,053 B2 | 4/2008 | Sanai et al. | |
| 7,793,108 B2 | 9/2010 | Narayanaswami et al. | |
| 12,299,092 B1* | 5/2025 | Jones, Jr. | ............ H04L 63/1408 |
| 2019/0121953 A1* | 4/2019 | Chari | ...................... G06F 21/35 |
| 2020/0042694 A1* | 2/2020 | Karpovsky | ............ G06Q 10/06 |
| 2021/0182378 A1* | 6/2021 | Farivar | .................... G06F 21/46 |
| 2023/0252114 A1* | 8/2023 | Cabrera Lozoya | ... G06F 40/253 726/7 |

OTHER PUBLICATIONS

Kanta A, Coisel I, Scanlon M. Smarter password guessing techniques leveraging contextual information and OSINT. In2020 International Conference on Cyber Security and Protection of Digital Services (Cyber Security) Jun. 15, 2020 (pp. 1-2). IEEE. (Year: 2020).*

* cited by examiner

*Primary Examiner* — James R Turchen
(74) *Attorney, Agent, or Firm* — Weiss & Arons LLP

(57) ABSTRACT

Systems and methods for automating generation of a strong and memorable password. Systems may include a computer configured to receive units of information from the user, use a machine learning model to eliminate units of information found when searching open-source intelligence (OSINT) available about the user, use the machine learning model to identify portions of the non-eliminated units of information, and use the machine learning model to combine the portions into memorable password options. Systems may include the computer configure to use the machine learning model to eliminate any of the password options found when searching OSINT, present a subset of the non-eliminated password options to the user, receive the selected password from the user, use the machine learning model to generate an obfuscated reminder for the selected password, and provide the obfuscated reminder to the user.

18 Claims, 5 Drawing Sheets

MEMORABLE AND STRONG PASSWORD GENERATOR AUTOMATED WITH A MACHINE LEARNING MODEL

FIELD OF TECHNOLOGY

Aspects of the disclosure relate to automated password generation. Specifically, aspects of the disclosure relate to using a machine learning model to automate the generation of memorable passwords.

BACKGROUND OF THE DISCLOSURE

Remembering passwords is a significant concern. Accounts a user accesses frequently may be easy to remember provided the password is not too complex. However, passwords for accounts one rarely accesses may be difficult to remember. A user's brain may compartmentalize the password as non-critical information which the user does not need to remember.

Current password management storage and creation solutions may not offer a way to customize the generation of password options that are strong, yet memorable. Passwords generated from the creation solutions may focus on creating a strong password, buy may not be memorable to the standard user and thus require storage in password wallets or written solutions that are both susceptible to breach and risk.

Creating memorable passwords may lead a user to use words and concepts familiar to them, words common to the general population, repeat the password for multiple accounts, and use sequences of characters or sequential passwords, repetitive numbers, or keyboard walking. A sequential password may include a change from "password1234" to "password1235." A repetitive number password may include "1111" or "3333." Keyboard walking may include passwords found in sequential characters on the keyboard such as "Qwerty."

However, to make a strong password, these practices are discouraged. Common advice for making a strong password may include using a mix of uppercase letters, lowercase letters, numbers, and symbols, creating separate passwords for each account independently, avoiding common dictionary words, and avoiding the use of repetitive or sequential characters.

Even when the user utilizes password management, storage, or creation solutions to manage most of their passwords, the user may still need to remember the password that allows them to access that solution. The user may also be prohibited from using such a solution in certain circumstances, such as passwords allowing access to their employer's systems. Thus, the use of such solutions doesn't eliminate the need for creating secure and memorable passwords.

Current password generation solutions may require information used to generate the password to be stored at the local device or in a network, without deletion. For example, the information may be stored in a computer's read-only memory (ROM). Keeping this data may make it more likely that an attack to access the data may reveal information from which a selected password may be generated.

Therefore, there is a need for an apparatus and method for the creation of passwords which are strong and memorable.

SUMMARY OF THE DISCLOSURE

Provided may be an apparatus and method for the generation of a strong and memorable password.

Further provided may be an apparatus and method for automating the generation of a strong and memorable password.

Methods may include a computer receiving units of information. The units of information may comprise one or more words obtained from the user. The units of information may comprise one or more words obtained from sources pertaining to the user. The units of information may comprise one or more words obtained from the user and from data sources pertaining to the user.

Methods may include the computer running a generative pre-trained transformer (GPT) machine learning model to eliminate units of information which are found when searching open-source intelligence (OSINT) available about the user, Eliminating some units of information may leave a subset of units of information which were not eliminated.

Methods may include using the computer to run a machine learning model to identify portions of a sampling of the subset of the units of information. The machine learning model may be a GPT machine learning model. The machine learning model may be a machine learning model that is not a GPT machine learning model.

Methods may include the computer running a machine learning model selecting portions which are memorable to the user. A memorable portion, in some embodiments, may be considered, for the purposes of this application, a portion that contains at least 70% of the characters of one of a previous portion of a password, a relevant noun, or similar.

Methods may include using a computer to run a machine learning model to combine portions into password options. The machine learning model may be a GPT machine learning model. The machine learning model may be a machine learning model that is not a GPT machine learning model.

Methods may include the computer running a machine learning model selecting password options which are memorable to the user. A memorable password option, in some embodiments, may be considered, for the purposes of this application, a password option that contains at least 70% of the characters of a password previously selected by the user, a relevant noun, or similar.

Character classes may include lower-case letters such as a-z, upper-case letters such as A-Z, numbers such as 0-9, and common punctuation symbols such as ~'@#$%^&*( )_-+ ={[}]|\:;'"<,>.?/, "extended" characters used in non-English languages using Roman script such as characters incorporating diacritical or accent marks, single- or multi-byte Unicode characters encoding glyphs from non-Roman-script languages such as Mandarin Chinese, Korean, or Arabic, or single- or multi-byte characters representing pictographic concepts not particular to any language, such as "emoji." The user may or may not choose to restrict the model from using part or all those character classes in the generation of a password.

Methods may further include substituting a character class other than a lower-case letter, an upper-case letter, or a number for a lower-case letter, an upper-case letter, or a number.

Each of the password options may be a password option that does not form a word found in a dictionary or have an appearance of a word found in a dictionary. The password option, as a whole, may be a password option that does not form a word found in a dictionary or have an appearance of a word found in a dictionary. A part of the password option may be a password option that does not form a word found in a dictionary or have an appearance of a word found in a dictionary.

The computer running the machine learning model such as a GPT machine learning model may include a computer processor, a computer's central processing unit (CPU), a graphic-processing unit (GPU), separate element specifically for processing neural-network algorithms, or any other suitable system. A computer processor which may include a computer's CPU may run the machine learning model including the GPT machine learning model. A system's GPU may run the machine learning model including the GPT machine learning model. A separate element specifically for processing neural-network algorithms, including the Neural Engine found in Apple Silicon chips, may run the machine learning model including the GPT machine learning model.

Methods may include checking for sequential passwords, repetitive numbers, or keyboard walking. If found, methods may include eliminating the password option from consideration by the user.

Methods may include considering known exposures and breaches of passwords. Methods may use machine learning to crawl known breaches and confirm this password, and close variations, are not already known or do not already exist.

Methods may include the computer presenting to the user a subset of password options. The method may include a method that does not use a machine learning model. The machine learning model may be a OPT machine learning model. The machine learning model may be a machine learning model that is not a OPT machine learning model.

Methods may include the computer receiving from the user a selected password from the subset of password options. The method may include a method that does not use a machine learning model. The machine learning model may be a GPT machine learning model. The machine learning model may be a machine learning model that is not a GPT machine learning model.

Methods may include the computer running a machine learning model to generate an obfuscated reminder for the selected password. The obfuscated reminder may contain a reminder for each portion of the selected password. The machine learning model may be a OPT machine learning model. The machine learning model may be a machine learning model that is not a GPT machine learning model.

Methods may include the computer running a machine learning model to provide the obfuscated reminder to the user. The machine learning model may be a GPT machine learning model. The machine learning model may be a machine learning model that is not a GPT machine learning model.

Methods may include where OSINT includes internet, public government data, media, commercial data, academic and professional publications, gray literature, and any combinations thereof. Internet may include social media websites, blogs, publications, news cites, YouTube, and the like. Public government data may include government reports, telephone directories, press conferences, and the like. Media may include printed publications, radio, television, and the like. Commercial data may include location data or metadata such as metadata related to the user's online requests, publicly available commercial databases, commercial assessments, and the like. Academic and professional publications may include information derived from theses, journal articles, symposia, conferences, and the like. Gray literature may include research and materials produced by organizations that may be available to the public, but not through the traditional publication and distribution channels mentioned above. These may include patents, white papers, government, and financial compliance documents, and the like.

Methods may include units of information obtained from sources pertaining to the user such as a desktop computer, data stored on a laptop computer, data stored on a tablet computer, data stored on a mobile device, a cloud storage, and the like.

Methods may include units of information obtained from sources pertaining to the user such as closed-source intelligence (CSINT) about the user. CSINT may include paid-for intelligence, such as business intelligence reports, market updates, and the like. For example, paid-for commercial reports and assessments, such as from Dun and Bradstreet. CSINT may include intelligence that requires a trusted partnership before information is shared.

Methods may further include the computer running a machine learning model with units of information obtained as above to determine words, or other data elements derived from such words through common substitutions, abbreviations, mnemonics, acronyms, or the like, that the model determines can be inferred as likely elements of a password that the user might choose themselves based on information about the user available to the model, That information may include data from OSINT, CSINT, or other data sources available to the model.

Methods may further include the computer running a GPT machine learning model to reject password options generated by a machine learning model on the basis that they contain units of information or data elements derived from those units of information that the GPT machine learning model has determined can be inferred as likely elements of a password that the user might choose themselves. This GPT machine learning model may draw upon OSINT data to process the password options and conclude regarding a predictability of a password option.

Methods may further include the computer storing the units of information in a local memory. Local memory may include direct-access data storage media. Local memory may include random-access memory (RAM). Local memory may include hard disks, CD-RWs, DVD-RWs and the older magnetic tapes and drum memory. Methods may further include the computer destroying, after receiving the selected password, the units of information. The local memory may be in electronic communication with the computer. The local memory may be in physical proximity to the computer.

Methods may further include the computer storing components of the units of information in a local memory. Methods may further include the computer destroying, after receiving the selected password, the components of the units of information. The local memory may be in electronic communication with the computer. The local memory may be in physical proximity to the computer.

Methods may further include the computer storing the two or more passwords in a local memory. Methods may further include the computer destroying, after receiving the selected password, the password options from the local memory. The local memory may be in electronic communication with the computer. The local memory may be in physical proximity to the computer.

Methods may include the computer running a machine learning model to generate an obfuscated reminder for the selected password. The obfuscated reminder may contain a reminder for each portion of the selected password. The machine learning model may be a GPT machine learning model. The machine learning model may be a machine learning model that is not a GPT machine learning model.

Methods may further include the computer running a machine learning model to generate another obfuscated reminder for the selected password which may be less obfuscated than the previous obfuscated reminder. The machine learning model may be a GPT machine learning model. The machine learning model may be a machine learning model that is not a GPT machine learning model.

Methods may further include the computer running a machine learning model to provide the less obfuscated reminder. The less obfuscated reminder may be provided to the user when the user cannot remember the selected password. The less obfuscated reminder may be provided to the user when the user cannot remember the selected password. The machine learning model may be a GPT machine learning model. The machine learning model may be a machine learning model that is not a GPT machine learning model.

Methods may further include the user selecting a new password after a period. The period may be an arbitrary period including 90 days, 180 days, a year, or any other suitable period. The period may be set according to the strength of the selected password. For a stronger password, a longer period may be set. For a weaker password, a short period of time may be set. The user may set frequency for updating the password. The user may set frequency for updating the password based on requirements imposed by the user's employer. The user may set frequency for updating the password based on requirements imposed by a website utilized by the user.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
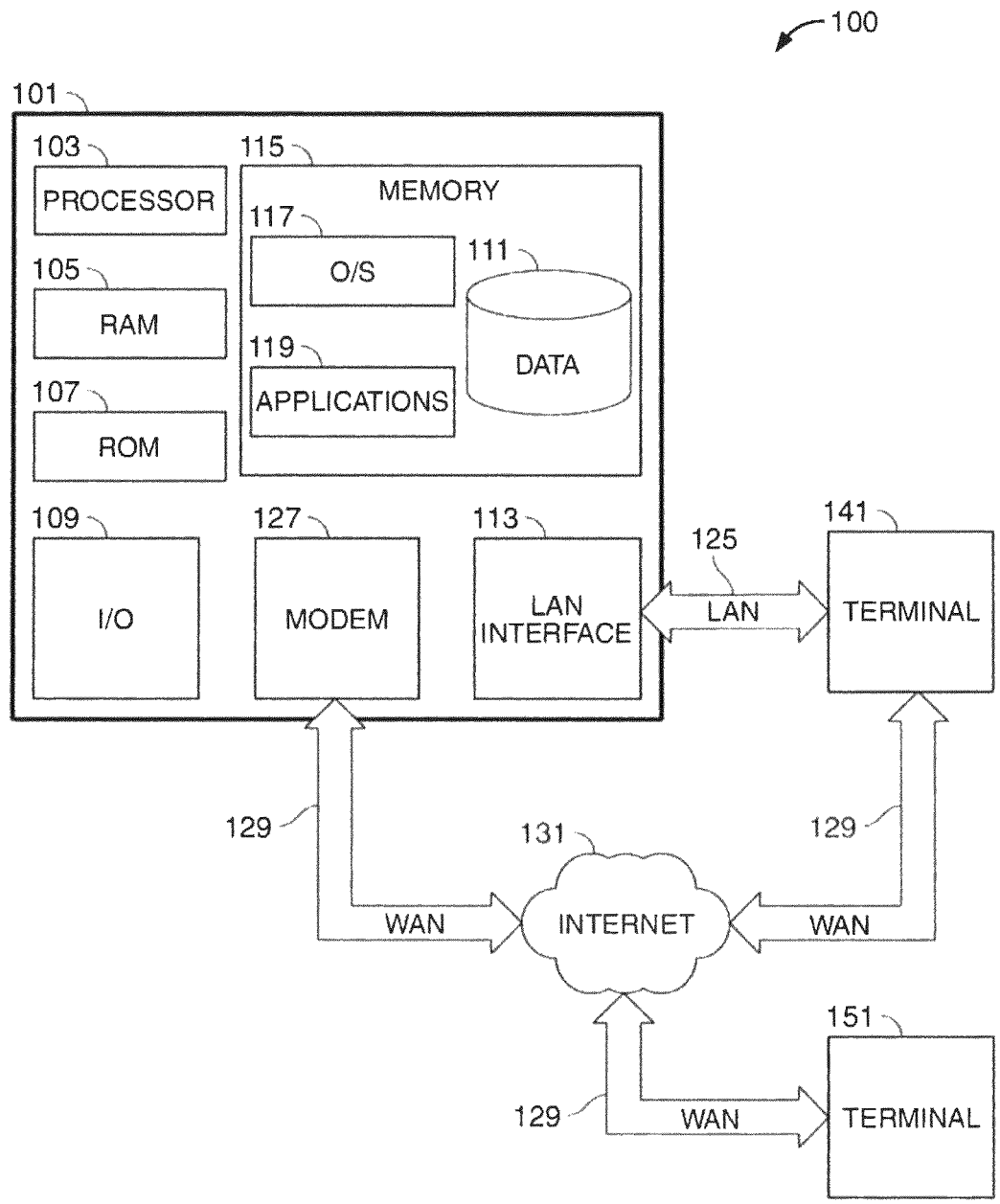
FIG. 1 shows an illustrative block diagram in accordance with principles of the disclosure.

Provided may be an apparatus, method, and system for the automation of password generation. Provided may be an apparatus, methods, and systems for use of a machine learning model to automate the generation of a strong and memorable password may be provided, Provided may be an apparatus, methods, and systems for automating a generation of a strong and memorable password by guiding a user when the user provides units of information. Provided may be an apparatus, methods, and systems for automating a generation of a strong and memorable password by guiding a user to avoid OSINT information and their derivatives when the user provides units of information.

Threat actors may defeat a user's password due to the user choosing words that are memorable to them when selecting a password. The threat actor may guess what things the user would consider memorable by using what they know about the user's interests. Social media may provide a ready insight into users' interests, and that information is frequently public. There are other public sources of information that may also give clues as to a user's interests. The sources, together, may make up OSINT.

Generating passwords that are strong and memorable may remain important even after the advent of password managers. A user must still remember the password used for the password manager. Additionally, some passwords are passwords that may not be permitted to be stored in a password manager. For example, employers may require passwords to be kept out of a password manager.

The systems and methods may identify words that are familiar to the user but not to the general population. The systems and methods may identify words that even after searching OSINT about the user, are still familiar to the user but not to the general population.

The systems and methods may use common methods to build a list of words from OSINT and other supplied sources. The list of words may include words that may tend to provide insight into the user's interests and proclivities. The list may exclude unimportant words such as conjunctions, articles, common verbs, and the like that wouldn't offer insight into the user's specific interests and proclivities.

The systems and methods may use machine learning models, together with one or more corpuses of human language input, to derive an additional list of words that are semantically related to the aforementioned list of keywords at multiple levels of consanguinity; such as: terms strongly related to the original words, terms distantly related to the original words but where the machine learning model assesses a significant overlap of interest may exist, terms strongly related to those more-distant words, terms that may be inferred as likely to be of interest to the user based on some combination of the original words together with common knowledge, such as inferring the likelihood of certain interests based on geographical location, political affiliation, educational history, civic associations, and the like.

The systems and methods may apply common transformations to those words that are known to be used by human users. Those transformations may include replacing one or more characters with a visually or semantically similar character; selecting certain characters from keywords based on their position in the keyword; replacing a character with a semantically equivalent word, or portion thereof, abbreviation, symbol, or any combination thereof; another transformation widely known to be used and reducible to a rule; or any combination or sequence of those transformations.

Use the resulting list of words, inferred words, and derivations of those words and inferred words to prevent or dissuade the user from choosing a password that contains such elements, thereby preventing the user from inadvertently choosing a memorable password that is potentially guessable by a person who knows them well or who has researched public information about them.

Some password-requiring entities may disallow certain characters or character classes from passwords. To make the systems and methods most useful, they may include allowing a user to set which classes of characters may be used in a password.

A computer processor including a computer's central processing unit (CPU) may run the machine learning model including the GPT machine learning model. A system's graphics-processing unit (GPU) may run the machine learning model including the GPT machine learning model. A separate element specifically for processing neural-network algorithms, including the Neural Engine found in Apple Silicon chips, may run the machine learning model including the GPT machine learning model.

As an example, a bad actor who has an idea what a user might be interested in may infer a list of words related to those interests. For example, if a user has expressed that they are a fan of a particular football team, their password may contain words related to that team, such as slogans, players, stadium names, etc., to football generally, etc. Further, the bad actor may infer that the user's password may contain modified versions of those words. For example, certain letters may be substituted according to common rules, such as replacing the letter O with the numeral 0. The user may take a memorable multi-word phrase, such as the full name of a player and their position, such as "John Doe, quarterback," and turn it into an element of their password by using initial letters, such as "JDq," last letters "nek," or other relatively simple substitution rules.

In addition to public-source data, the user may opt to provide access to non-public data, such as information stored on their hard drive, to increase the model's understanding of their interests. The machine learning model may account for those interests even if the user hasn't expressed them explicitly in public. This may be helpful, for example, if the user later makes social-media posts or otherwise publicizes them, the system and method may already have warned the user against using passwords easily guessable with that information. This system and method may also protect against the user's apparently undisclosed interest being inferred from other information about the user. For instance, a user who lives in Buffalo may reasonably be inferred as likely to be a fan of the Buffalo Bills.

Systems and methods may utilize obtained information, and derivatives thereof by using the machine learning model, to prevent the user from using a password that is more easily guessed using known information about the user's interests.

A value of machine learning models, such as GPT, may include their ability to draw inferences from a corpus of data. For example, with regular keyword matching, one could note that a user mentioned "Star Wars" in a social-media post and prevent the use of that term, or simple transformations of the term, in a password.

With machine-learning tools like GPT, the system and method may note that the user mentioned "Star Wars." The system and method may use a large language model trained on a vast corpus of human expression to determine that a person who used that term in a social-media post is likely to also be interested in closely related topics such as "baby Yoda," tangentially-related topics such as "Star Trek," thematically-related concepts such as "science fiction, etc.; and determine words that are statistically likely to align with those topics based on observed human behavior; and include those terms in the list of words that should be avoided in constructing passwords as well.

Methods may include a computer running a generative pre-trained transformer (GPT) machine learning model to generate a first list of words relating to the interests of the user as found when searching open-source intelligence (OS-INT) available about the user.

Methods may include a computer running the OPT machine learning model to derive a second list of words which are inferred from the first list of words;

Methods may include a computer receiving two or more units of information from the user related to the user.

Methods may include a computer running the GPT machine learning model to reject any of the two or more units of information found in the first list of words or the second list of words.

Method may include a computer to run the GPT machine learning model repeating the steps of receiving two or more units of information and rejecting any of the two or more units of information until two or more units of information from the user are not rejected by the computer running the GPT machine learning model.

Methods may include using the computer to run a machine learning model to identify portions of a sampling of the subset of the units of information. The machine learning model may be a OPT machine learning model. The machine learning model may be a machine learning model that is not a GPT machine learning model.

Methods may include the computer running a machine learning model selecting portions which are memorable to the user. A memorable portion, in some embodiments, may be considered, for the purposes of this application, a portion that contains at least 70% of the characters of one of a previous portion of a password, a relevant noun, or similar. A memorable portion may contain at least 80% of the characters. A memorable portion may contain at least 90% of the characters.

Methods may include using a computer to run a machine learning model to combine portions into password options. The machine learning model may be a GPT machine learning model. The machine learning model may be a machine learning model that is not a GPT machine learning model.

Methods may include the computer running a machine learning model selecting password options which are memorable to the user. A memorable password option, in some embodiments, may be considered, for the purposes of this application, a password option that contains at least 70% of the characters of a password previously selected by the user, a relevant noun, or similar. A memorable portion may contain at least 80% of the characters. A memorable portion may contain at least 90% of the characters.

Character classes may include lower-case letters such as a-z, upper-case letters such as A-Z, numbers such as 0-9, and common punctuation symbols such as ~'@#$%^&*( )_-+={[}]|\:;"'<,>.?/, "extended" characters used in non-English languages using Roman script such as characters incorporating diacritical or accent marks, single- or multi-byte Unicode characters encoding glyphs from non-Roman-script languages such as Mandarin Chinese, Korean, or Arabic, or single- or multi-byte characters representing pictographic concepts not particular to any language, such as "emoji." The user may or may not choose to restrict the model from using part or all those character classes in the generation of a password.

Methods may further include substituting a character class other than a lower-case letter, an upper-case letter, or a number for a lower-case letter, an upper-case letter, or a number.

Each of the password options may be a password option that does not form a word found in a dictionary or have an appearance of a word found in a dictionary. The password option, as a whole, may be a password option that does not form a word found in a dictionary or have an appearance of a word found in a dictionary. A part of the password option may be a password option that does not form a word found in a dictionary or have an appearance of a word found in a dictionary.

The computer running the machine learning model such as a GPT machine learning model may include a computer processor, a computer's central processing unit (CPU), a graphic-processing unit (GPU), separate element specifically for processing neural-network algorithms, or any other suitable system. A computer processor which may include a computer's CPU may run the machine learning model including the GPT machine learning model. A system's GPU may run the machine learning model including the GPT machine learning model. A separate element specifically for processing neural-network algorithms, including the Neural Engine found in Apple Silicon chips, may run the machine learning model including the GPT machine learning model.

Methods may include checking for sequential passwords, repetitive numbers, or keyboard walking. If found, methods may include eliminating the password option from consideration by the user.

Methods may include considering known exposures and breaches of passwords. Methods may use machine learning to crawl known breaches and confirm this password, and close variations, are not already known or do not already exist.

Methods may include the computer presenting to the user a subset of password options. The method may include a method that does not use a machine learning model. The machine learning model may be a GPT machine learning model. The machine learning model may be a machine learning model that is not a GPT machine learning model.

Methods may include the computer receiving from the user a selected password from the subset of password options. The method may include a method that does not use a machine learning model. The machine learning model may be a GPT machine learning model. The machine learning model may be a machine learning model that is not a GPT machine learning model.

Methods may include the computer running a machine learning model to generate an obfuscated reminder for the selected password. The obfuscated reminder may contain a reminder for each portion of the selected password. The machine learning model may be a GPT machine learning model. The machine learning model may be a machine learning model that is not a GPT machine learning model.

Methods may include the computer running a machine learning model to provide the obfuscated reminder to the user. The machine learning model may be a GPT machine learning model. The machine learning model may be a machine learning model that is not a GPT machine learning model.

Methods may include where OSINT includes internet, public government data, media, commercial data, academic and professional publications, gray literature, and any combinations thereof. Internet may include social media websites, blogs, publications, news cites, YouTube, and the like. Public government data may include government reports, telephone directories, press conferences, and the like. Media may include printed publications, radio, television, and the like. Commercial data may include location data or metadata such as metadata related to the user's online requests, publicly available commercial databases, commercial assessments, and the like. Academic and professional publications may include information derived from theses, journal articles, symposia, conferences, and the like. Gray literature may include research and materials produced by organizations that may be available to the public, but not through the traditional publication and distribution channels mentioned above. These may include patents, white papers, government, and financial compliance documents, and the like.

Methods may include units of information obtained from sources pertaining to the user such as a desktop computer, data stored on a laptop computer, data stored on a tablet computer, data stored on a mobile device, a cloud storage, and the like.

Methods may include units of information obtained from sources pertaining to the user such as closed-source intelligence (CSINT) about the user. CSINT may include paid-for intelligence, such as business intelligence reports, market updates, and the like. For example, paid-for commercial reports and assessments, such as from Dun and Bradstreet. CSINT may include intelligence that requires a trusted partnership before information is shared.

Methods may further include the computer running a machine learning model with units of information obtained as above to determine words, or other data elements derived from such words through common substitutions, abbreviations, mnemonics, acronyms, or the like, that the model determines can be inferred as likely elements of a password that the user might choose themselves based on information about the user available to the model. That information may include data from OSINT, CSINT, or other data sources available to the model.

Methods may further include the computer running a GPT machine learning model to reject password options generated by a machine learning model on the basis that they contain units of information or data elements derived from those units of information that the GPT machine learning model has determined can be inferred as likely elements of a password that the user might choose themselves. This GPT machine learning model may draw upon OSINT data to process the password options and conclude regarding a predictability of a password option.

Methods may further include the computer storing the units of information in a local memory. Local memory may include direct-access data storage media. Local memory may include random-access memory (RAM). Local memory may include hard disks, CD-RWs, DVD-RWs and the older magnetic tapes and drum memory. Methods may further include the computer destroying, after receiving the selected password, the units of information.

The local memory may be in electronic communication with the computer. The local memory may be in physical proximity to the computer.

Methods may further include the computer storing components of the units of information in a local memory, Methods may further include the computer destroying, after receiving the selected password, the components of the units of information. The local memory may be in electronic communication with the computer. The local memory may be in physical proximity to the computer.

Methods may further include the computer storing the two or more passwords in a local memory. Methods may further include the computer destroying, after receiving the selected password, the password options from the local memory. The local memory may be in electronic communication with the computer. The local memory may be in physical proximity to the computer.

Methods may include the computer running a machine learning model to generate an obfuscated reminder for the selected password. The obfuscated reminder may contain a reminder for each portion of the selected password. The machine learning model may be a GPT machine learning model. The machine learning model may be a machine learning model that is not a GPT machine learning model.

Methods may further include the computer running a machine learning model to generate another obfuscated reminder for the selected password which may be less obfuscated than the previous obfuscated reminder. The machine learning model may be a GPT machine learning model. The machine learning model may be a machine learning model that is not a GPT machine learning model.

Methods may further include the computer running a machine learning model to provide the less obfuscated reminder. The less obfuscated reminder may be provided to the user when the user cannot remember the selected password. The less obfuscated reminder may be provided to the user when the user cannot remember the selected password. The machine learning model may be a GPT machine learning model. The machine learning model may be a machine learning model that is not a GPT machine learning model.

Methods may further include the user selecting a new password after a period. The period may be an arbitrary period including 90 days, 180 days, a year, or any other suitable period. The period may be set according to the strength of the selected password. For a stronger password, a longer period may be set. For a weaker password, a short period of time may be set. The user may set frequency for updating the password. The user may set frequency for updating the password based on requirements imposed by the user's employer. The user may set frequency for updating the password based on requirements imposed by a website utilized by the user.

In some embodiments, a portion may include one to ten characters. A portion may include one to eight characters. A portion may include two to eight characters. A portion may contain any other reasonable number of characters.

In some embodiments, a password option may contain two to twelve portions. A password option may contain two to ten portions. A password option may contain three to twelve portions. A password option may contain any other reasonable number of portions.

In some embodiments, a password option may contain at least four characters. A password option may contain at least five characters. A password option may contain at least six characters. A password option may contain at least seven characters. A password option may contain at least eight characters.

Each password option may contain at least two character classes. Each password option may contain at least three character classes. Each password option may contain at least four character classes. Character classes include lower-case letters, upper-case letters, numbers, common punctuation symbols, extended characters used in non-English languages using Roman script, single- or multi-byte Unicode characters encoding glyphs from non-Roman-script languages, and single- or multi-byte characters representing pictographic concepts not particular to any language.

The computer may eliminate password options found within three character substitutions of a list of words generated when searching OSINT for a user. A password may be eliminated when found within two character substitutions. A password may be eliminated when found within one character substitution.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional, and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment, FIG. 1 shows an illustrative block diagram of system 100 that includes computer 101. Computer 101 may alternatively be referred to herein as an "engine," "server" or a "computing device." Computer 101 may be a workstation, desktop, laptop, tablet, smartphone, or any other suitable computing device. Elements of system 100, including computer 101, may be used to implement various aspects of the systems and methods disclosed herein. Each of the systems, methods and algorithms illustrated below may include some or all the elements and apparatus of system 100.

Computer 101 may have a processor 103, including a central processing unit (CPU), for controlling the operation of the device and its associated components, and may include RAM 105, ROM 107, input/output ("V/O)") 109, and a non-transitory or non-volatile memory 115. Machine-readable memory may be configured to store information in machine-readable data structures. Processor 103 may also execute all software running on the computer. Other components, such as Graphics Processing Unit (GPU), EEPROM, Flash memory, neural-network processing elements, or any other suitable components, may also be part of the computer 101.

Memory 115 may be comprised of any suitable permanent storage technology—e.g., a hard drive. Memory 115 may store software including the operating system 117 and application program(s) 119 along with any data 111 needed for the operation of the system 100. Memory 115 may also store videos, text, and/or audio assistance files. The data stored in memory 115 may also be stored in cache memory, or any other suitable memory.

I/O module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

System 100 may be connected to other systems via a local area network (LAN) interface 113. System 100 may operate in a networked environment supporting connections to one or more remote computers, such as terminals 141 and 151. Terminals 141 and 151 may be personal computers or servers that include many or all the elements described above relative to system 100. The network connections depicted in FIG. 1 include a local area network (LAN) 125 and a wide area network (WAN) 129 but may also include other networks. When used in a LAN networking environment, computer 101 is connected to LAN 125 through LAN interface 113 or an adapter. When used in a WAN networking environment, computer 101 may include a modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP, and the like is presumed, and the system can be operated in a client-server configuration to permit retrieval of data from a web-based server or application programming interface (API). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may include instructions to store the data in cache memory, the hard drive, secondary memory, or any other suitable memory.

Additionally, application program(s) 119, which may be used by computer 101, may include computer executable instructions for invoking functionality related to communication, such as e-mail, Short Message Service (SMS), and voice input and speech recognition applications. Application program(s) 119 (which may be alternatively referred to herein as "plugins," "applications," or "apps") may include computer executable instructions for invoking functionality related to performing various tasks. Application program(s) 119 may utilize one or more algorithms that process received executable instructions, perform power management routines or other suitable tasks.

Application program(s) 119 may include computer executable instructions (alternatively referred to as "programs"). The computer executable instructions may be embodied in hardware or firmware (not shown). Computer 101 may execute the instructions embodied by the application program(s) 119 to perform various functions.

Application program(s) 119 may utilize the computer-executable instructions executed by a processor. Generally, programs include routines, programs, objects, components, data structures, etc., that perform tasks or implement abstract data types. A computing system may be operational with distributed computing environments where tasks are performed by remote processing devices that are linked through a communications network. In a distributed computing environment, a program may be in both local and remote computer storage media including memory storage devices. Computing systems may rely on a network of remote servers hosted on the Internet to store, manage, and process data (e.g., "cloud computing" and/or "fog computing").

Any information described above in connection with data 111, and any other suitable information, may be stored in memory 115.

The invention may be described in the context of computer-executable instructions, such as application(s) 119, being executed by a computer. Generally, programs include routines, programs, objects, components, data structures, etc., that perform tasks or implement particular data types. The invention may also be practiced in distributed computing environments where tasks are performed by remote processing devices that are linked through a communications network. In a distributed computing environment, programs may be in both local and remote computer storage media including memory storage devices. It should be noted that such programs may be considered for the purposes of this application as engines with respect to the performance of the tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 141 and/or terminal 151 may be portable devices such as a laptop, cell phone, tablet, smartphone, or any other computing system for receiving, storing, transmitting and/or displaying relevant information. Terminal 141 and/or terminal 151 may be one or more user devices. Terminals 141 and 151 may be identical to system 100 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

Figure 2:
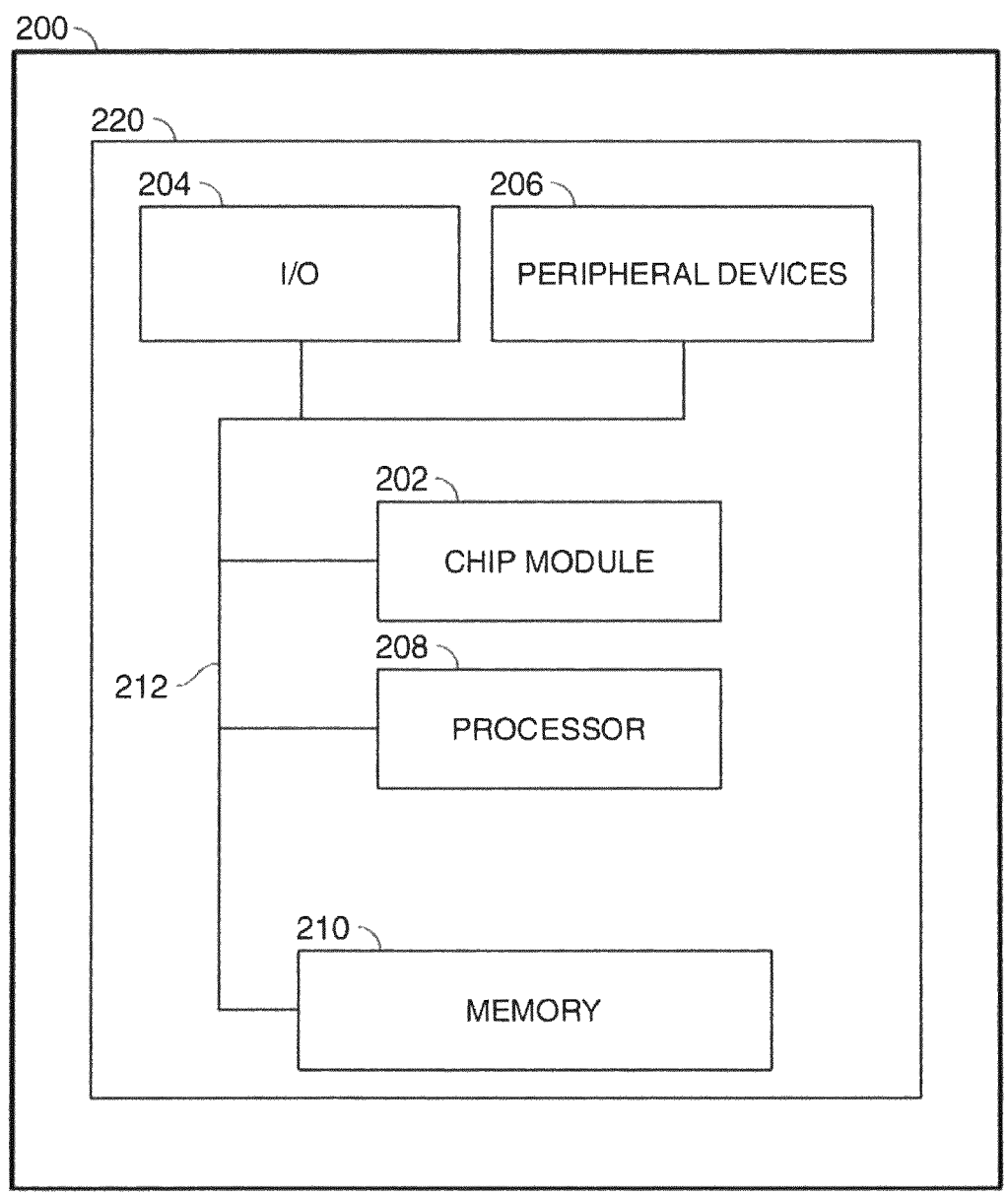
FIG. 2 shows an illustrative block diagram in accordance with principles of the disclosure.

FIG. 2 shows illustrative apparatus 200 that may be configured in accordance with the principles of the disclosure. Apparatus 200 may be a computing device. Apparatus 200 may include one or more features of the apparatus shown in FIG. 2. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 119, signals, and/or any other suitable information or data structures.

Components 202, 204, 206, 208 and 210 may be coupled together by a system bus or other interconnections 212 and may be present on one or more circuit boards such as circuit board 220. In some embodiments, the components may be integrated into a single chip. The chip may be silicon-based.

Figure 3:
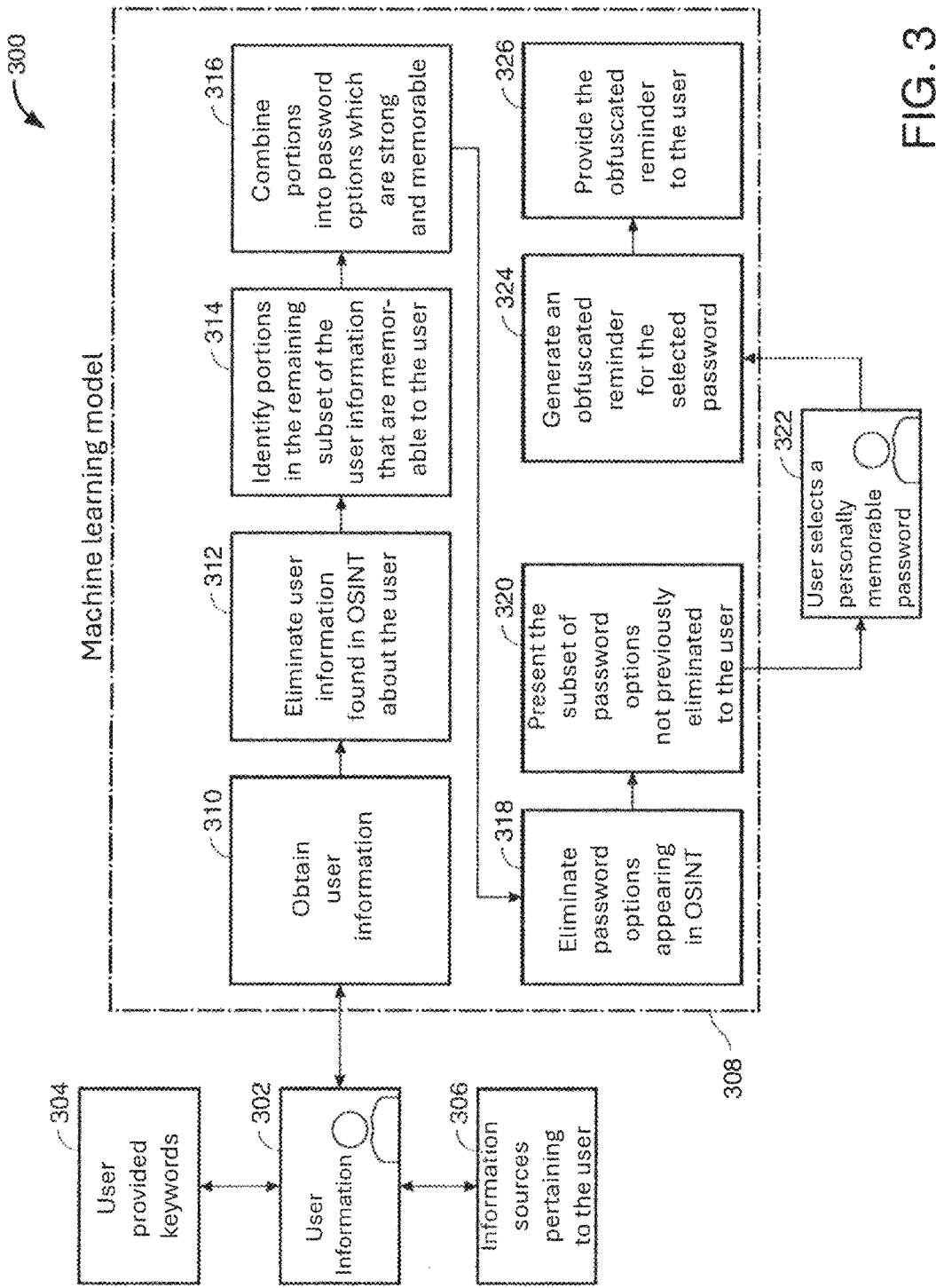
FIG. 3 shows an illustrative block diagram in accordance with principles of the disclosure.

FIG. 3 shows a flow diagram 300. User information 302 may be obtained by machine learning model 308. User information 302 may include user provided keywords 304. User information 302 may include sources pertaining to the user 306. Machine learning model at 310 may obtain user information 302 about the user. Machine learning model at 312 may eliminate user information found in OSINT about the user. Machine learning model at 314 may use the subset of user information not eliminated at 312 and identifies portions of the user information in the subset that are memorable to the user. Machine learning model at 316 may combine portions into password options which are strong and memorable. Machine learning model at 318 may determine password options appearing in OSINT and eliminate them from the password options. Machine learning model at 320 may use the subset of password options not eliminated at 318 and presents them to the user. At 322, the user may select the password most memorable to them. Machine learning model at 324 may generate an obfuscated reminder for the selected password. Machine learning model at 326 may provide the obfuscated reminder to the user. The obfuscated reminder may remind the user of the selected password.

Figure 4:
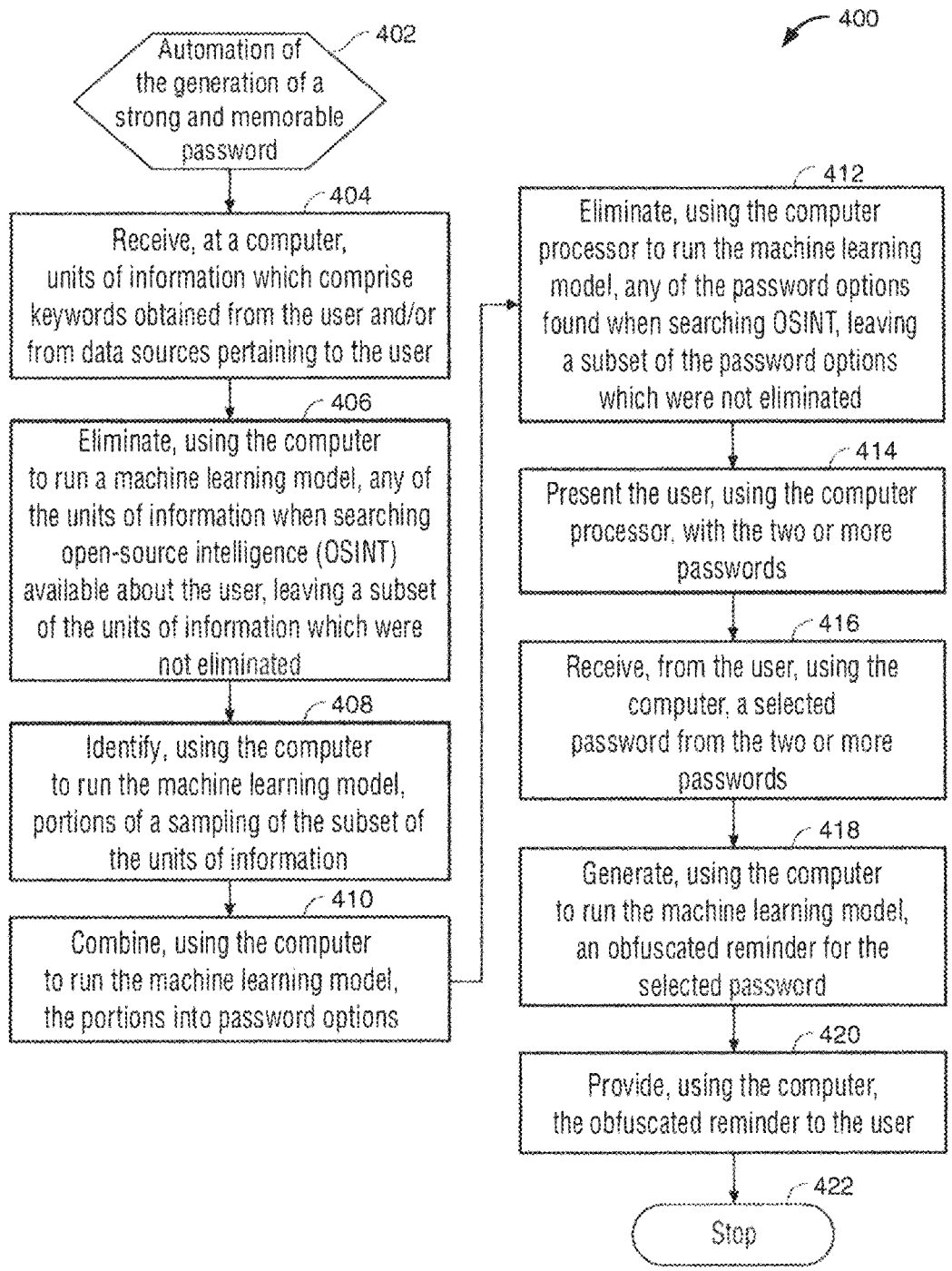
FIG. 4 shows an illustrative flowchart in accordance with principles of the disclosure.

FIG. 4 shows an illustrative flowchart 400, beginning at step 402, which may provide for automation of the generation of a strong and memorable password.

At step 404, a computer may receive units of information. The units of information may include keywords obtained from the user. The units of information may include keywords obtained from data sources pertaining to the user. The units of information may include keywords obtained from the user or from data sources pertaining to the user.

At step 406, the computer may run a machine learning model to eliminate any of the units of information which are found when searching OSINT available about the user.

At step 408, the computer may run the machine learning model to identify portions of the subset of units of information which were not eliminated at step 406. The computer may run the machine learning model to identify portions of a sampling of the subset of units of information which were not eliminated at step 406.

At step 410, the computer may run the machine learning model to combine the portions into password options.

At step 412, the computer may eliminate, using the computer to run the machine learning model, any of the password options found when searching OSINT, leaving a subset of the password options which were not eliminated.

At step 414, the computer may present the user with two or more passwords. The user may select the password which is most memorable to the user.

At step 416, the computer may receive from the user a selected password from the two or more passwords.

At step 418, the computer may run the machine learning model to generate an obfuscated reminder for the selected password. The obfuscated reminder may be a set of reminders where each component of the password has its own reminder. The obfuscated reminder may be a grouping of words to help the user remember the portions of the password and the order of those portions. The obfuscated reminder may be a grouping of words that forms a full sentence to help the user remember the portions of the password and the order of those portions. The obfuscated reminder may help the user to remember the password when the user has forgotten the actual selected password.

For example, user information and keywords may be obtained from the user and from sources pertaining to the user. The user information may include that their favorite dog is a golden retriever, the city where they were born is Denver, Colorado, the first school they attended was East Leonard Elementary School in Grand Rapids, Michigan, they won a tennis championship when they were a junior in high school which may be 11$^{th}$ grade, their first college major was political science before switching to business administration, and their favorite flower is a daffodil.

The keywords obtained from the user information may include Golden Retriever, Denver, Colorado, East Leonard Elementary School, tennis junior, political science, and Daffodil. The OSINT review of the user may reveal pictures of the user's golden retriever and a bouquet of daffodils the user received on their birthday. The machine learning model may eliminate these two from the list of user information.

The machine learning model may identify portions from the key words of DeCo, ELes, Tn11, PoSc. The machine learning model may replace the S of PoSc with the symbol &. The machine learning model may derive a password option of DeCoELesTa11Po&c. This password option may contain all four character types and is sixteen characters long which may rate this password option as a strong password.

The machine learning model may generate an obfuscated reminder for the selected password of city of birth, first school attended, sports accomplishment, and college major. The machine learning model may generate a more obfuscated reminder for the selected password of city of residence, school attended, accomplishment, and college interest.

At step 420, the computer may provide the obfuscated reminder to the user.

The illustrative flowchart 400 ends at step 422.

Figure 5:
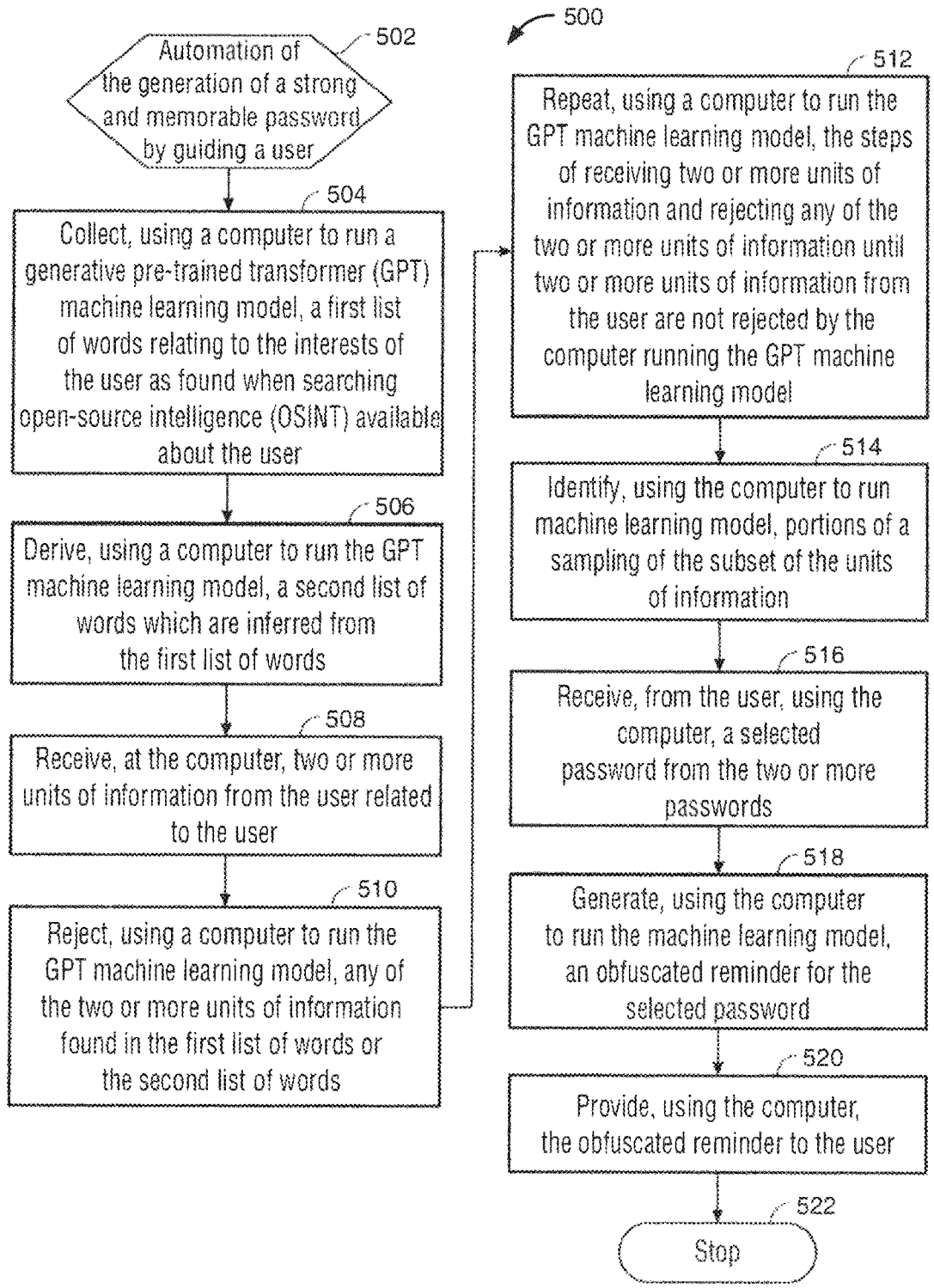
FIG. 5 shows an illustrative flowchart in accordance with principles of the disclosure.

FIG. 5 shows an illustrative flowchart 500, beginning at step 502, which may provide for automation of the generation of a strong and memorable password.

At step 504, the computer running a GPT machine learning model collects a first list of words relating to the interests of the user as found when searching open-source intelligence (OSINT) available about the user.

At step 506, the computer running the GPT machine learning model derives a second list of words which are inferred from the first list of words.

At step 508, the computer receives two or more units of information from the user related to the user.

At step 510, the computer running the GPT machine learning model rejects any of the two or more units of information found in the first list of words or the second list of words.

At step 512, the computer running the GPT machine learning model repeats the steps of receiving two or more units of information and rejecting any of the two or more units of information until two or more units of information from the user are not rejected by the computer running the GPT machine learning model.

At step 514, the computer may run the machine learning model to identify portions of the two or more units of information. The machine learning model may be a GPT machine learning model. The machine learning model may be a machine learning model that is not a GPT machine learning model.

At step 516, the computer may run the machine learning model to combine the portions into password options.

At step 518, the computer may eliminate, using the computer to run the GPT machine learning model, any of the password options found when searching OSINT, leaving a subset of the password options which were not eliminated.

At step 520, the computer may present the user with two or more passwords. The user may select the password which is most memorable to the user.

At step 522, the computer may receive from the user a selected password from the two or more passwords.

At step 524, the computer may run the machine learning model to generate an obfuscated reminder for the selected password. The obfuscated reminder may be a set of reminders where each component of the password has its own reminder. The obfuscated reminder may be a grouping of words to help the user remember the portions of the password and the order of those portions. The obfuscated reminder may be a grouping of words that forms a full sentence to help the user remember the portions of the password and the order of those portions. The obfuscated reminder may help the user to remember the password when the user has forgotten the actual selected password. The machine learning model may be a GPT machine learning model. The machine learning model may be a machine learning model that is not a GPT machine learning model.

At step 526, the computer may provide the obfuscated reminder to the user.

The illustrative flowchart 500 ends at step 528.

Thus, provided may be systems and methods for automating password generation. Specifically, provided may be systems and methods for using a machine learning model to automate the generation of memorable passwords. Persons skilled in the art will appreciate that the present invention can be practiced by other than the described embodiments, which are presented for purposes of illustration rather than of limitation. The present invention is limited only by the claims that follow.

What is claimed is:

1. A method for automating a generation of a strong and memorable password, the method comprising:
   receiving, at a computer, units of information about a user obtained from the user or from sources provided by the user which contain information about the user;
   eliminating, using the computer to run a generative pre-trained transformer (GPT) machine learning model, any of the units of information which are found when searching open-source intelligence (OSINT) available about the user, leaving a subset of the units of information which were not eliminated;
   identifying, using the computer to run a machine learning model, portions of a sampling of the subset of the units of information;
   combining, using the computer to run the machine learning model, the portions into password options, the password options being memorable to the user;
   eliminating, using the computer to run the GPT machine learning model, any of the password options found when searching OSINT for a word found in a dictionary or a proper name of a person, character, product, or organization, leaving a subset of the password options which were not eliminated;
   presenting to the user, using the computer, the subset of the password options;
   receiving from the user, at the computer, a selected password from the subset of password options;
   generating, using the computer to run the machine learning model, an obfuscated reminder for the selected password, the obfuscated reminder containing a reminder for each portion of the selected password; and
   providing, using the computer, the obfuscated reminder to the user.

2. The method of claim 1, wherein the step of receiving, at a computer, units of information about a user comprises receiving two to ten units of information about the user.

3. The method of claim 1, wherein the units of information about the user are provided by the user or are obtained from sources pertaining to the user, the sources pertaining to the user comprise:
   a desktop computer, data stored on a laptop computer, data stored on a tablet computer, data stored on a mobile device, a cloud storage, and any combination thereof.

4. The method of claim 1, wherein the selected password is stored using NFT blockchain technology.

5. The method of claim 1, wherein the selected password is not stored on any local device.

6. The method of claim 1, wherein:
   the information about the user is stored in a memory local on a local device;
   the user information about the user is not stored at a central storage location; and
   the information about the user is erased after a password is selected.

7. The method of claim 1, wherein OSINT comprises:
   internet, public government data, media, public commercial data, academic and professional publications, dictionaries, gray literature, and any combinations thereof.

8. The method of claim 1, further comprising:
   substituting a character other than a lower-case letter, an upper-case letter, a number for a lower-case letter, an upper-case letter, or a number.

9. The method of claim 1, wherein:
   the selected password is a first password;
   the method is repeated after a period so that the user selects a second password to replace the first password.

10. The method of claim 1, wherein the obfuscated reminder for the selected password is a first obfuscated reminder, further comprising:
    generating, using the computer to run the machine learning model, a second obfuscated reminder for the selected password; and
    providing, using the computer to run the machine learning model, the second obfuscated reminder to the user when the user cannot remember the selected password when provided with the first obfuscated reminder;
    wherein:
    the first obfuscated reminder is more obfuscated than the second obfuscated reminder.

11. The method of claim 1, wherein the units of information about a user are obtained from the user, from sources containing information about the user, or from both the user and sources containing information about the user.

12. A method for automating a generation of a strong and memorable password by guiding a user to provide units of information, the method comprising:
    collecting, using a computer to run a generative pre-trained transformer (GPT) machine learning model, a first list of words relating to interests of the user as found when searching open-source intelligence (OSINT) available about the user;
    deriving, using a computer to run the GPT machine learning model, a second list of words which are inferred from the first list of words;
    receiving, at the computer, two or more units of information from the user related to the user;
    rejecting, using a computer to run the GPT machine learning model, any of the two or more units of information found in the first list of words or the second list of words;
    repeating, using a computer to run the GPT machine learning model, the steps of receiving units of information and rejecting units of information until two or more units of information from the user are not rejected by the computer running the GPT machine learning model;

identifying, using the computer to run machine learning model, portions of a sampling of the two or more units of information;

combining, using the computer to run the machine learning model, the portions into password options, the password options being memorable to the user;

eliminating, using the computer to run the GPT machine learning model, any of the password options found when searching OSINT for a word found in a dictionary or a proper name of a person, character, product, or organization, leaving a subset of the password options which were not eliminated;

presenting to the user, using the computer, the subset of the password options;

receiving from the user, at the computer, a selected password from the subset of password options;

generating, using the computer to run the machine learning model, an obfuscated reminder for the selected password, the obfuscated reminder containing a reminder for each portion of the selected password; and providing, using the computer, the obfuscated reminder to the user.

13. The method of claim 12, further comprising:
generating, using a computer to run the GPT machine learning model, a third list of words which comprise modified versions of words found on the first list of words and the second list of words;
wherein the step of rejecting includes rejecting any of the two or more units of information found in the first list of words, the second list of words, or the third list of words.

14. The method of claim 12, wherein:
the two or more units of information from the user is stored in a memory local on a local device;
the two or more units of information from the user is not stored at a central storage location; and
the two or more units of information from the user is erased after a password is selected.

15. The method of claim 12, wherein OSINT comprises: internet, public government data, media, public commercial data, academic and professional publications, dictionaries, gray literature, and any combinations thereof.

16. The method of claim 12, further comprising:
substituting a character other than a lower-case letter, an upper-case letter, a number for a lower-case letter, an upper-case letter, or a number.

17. A system for automated generation of a strong and memorable password, the system comprising:
a computer;
a first machine learning model, the first machine learning model being a generative pre-trained transformer (GPT) machine learning model for running on the computer; and
a second machine learning model;
the computer configured to:
receive units of information about a user;
use the first machine learning model to eliminate any of the units of information which are found when searching open-source intelligence (OSINT) available about the user, leaving a subset of the units of information which were not eliminated;
use the second machine learning model to identify portions of a sampling of the subset of the units of information;
use the second machine learning model to combine the portions into password options, the password options being memorable to the user;
use the first machine learning model to eliminate any of the password options found when searching OSINT for a word found in a dictionary or a proper name of a person, character, product, or organization, leaving a subset of the password options which were not eliminated;
present to a user the subset of the password options;
receive from the user a selected password from the subset of password options;
use the second machine learning model to generate an obfuscated reminder for the selected password, the obfuscated reminder containing a reminder for each portion of the selected password; and
provide the obfuscated reminder to the user.

18. The system of claim 17, wherein:
the second machine learning model includes the first machine learning model.

* * * * *